(12) United States Patent
Fu et al.

(10) Patent No.: US 11,371,960 B2
(45) Date of Patent: Jun. 28, 2022

(54) MICROSCALE GAS BREAKDOWN DEVICE AND PROCESS

(71) Applicant: Board of Trustees of Michigan State University, East Lansing, MI (US)

(72) Inventors: Yangyang Fu, East Lansing, MI (US); Peng Zhang, East Lansing, MI (US); John P. Verboncoeur, Okemos, MI (US)

(73) Assignee: Board of Trustees of Michigan State University, East Lansing, MI (US)

( * ) Notice: Subject to any disclaimer, the term of this patent is extended or adjusted under 35 U.S.C. 154(b) by 543 days.

(21) Appl. No.: 16/523,255

(22) Filed: Jul. 26, 2019

(65) Prior Publication Data

US 2020/0033293 A1     Jan. 30, 2020

Related U.S. Application Data

(60) Provisional application No. 62/711,109, filed on Jul. 27, 2018.

(51) Int. Cl.
*G01N 27/30*     (2006.01)
*H05H 1/00*     (2006.01)
*H05H 1/24*     (2006.01)
*H01J 17/40*     (2006.01)
*G01N 27/70*     (2006.01)

(52) U.S. Cl.
CPC ............. *G01N 27/70* (2013.01); *G01N 27/30* (2013.01); *H01J 17/40* (2013.01); *H05H 1/0006* (2013.01); *H05H 1/0081* (2013.01); *H05H 1/24* (2013.01)

(58) Field of Classification Search
CPC ...... H05H 1/0006; H05H 1/0081; H05H 1/24; H01J 1/30; H01J 17/40; G02N 27/30
See application file for complete search history.

(56) References Cited

U.S. PATENT DOCUMENTS 6,016,027 A  *  1/2000  DeTemple .............. H01J 61/72
                                                                313/356
2021/0208101 A1 *  7/2021  Aldayeh ................ G01N 27/70

FOREIGN PATENT DOCUMENTS

CN           113987881 A  *  1/2022

OTHER PUBLICATIONS

Semnani et al., "Pre-breakdown evaluation of gas discharge mechanisms in microgaps" Apr. 29, 2013, Appl. Phys. Lett. 102, 174102 (Year: 2013).*

(Continued)

*Primary Examiner* — Mariceli Santiago
(74) *Attorney, Agent, or Firm* — Harness, Dickey & Pierce, P.L.C.

(57) ABSTRACT

A microscale gas breakdown device includes a first surface and a second surface. The first surface and the second surface define a gap distance. The device includes a perturbation on the first surface or the second surface. The perturbation is defined by a height value and a radius value. The device includes a current source or a voltage source configured to apply a current or a voltage across the first surface and the second surface. In response to the current or the voltage being applied, a resulting discharge travels along a first discharge path in response to being exposed to a high pressure and a second discharge path in response to being exposed to a low pressure.

20 Claims, 8 Drawing Sheets

(56) References Cited

OTHER PUBLICATIONS

Radmilovic-Radjenovic et al. "A Particle-in-Cell Simulation of the High-Field Effect in Devices With Micrometer Gaps" Oct. 8, 2007, IEEE Transactions on Plasma Science ( vol. 35, Issue: 5, Oct. 2007), 1223-1228 (Year: 2007).*

Carazzetti et al. "Electrical breakdown at low pressure for planar microelectromechanical systems with 10- to 500-μm gaps" Jul. 2009, Journal of Micro/ Nanolithography, MEMS, and MOEMS 8(3), 031305-1/031305-9 (Year: 2009).*

Fu et al. "Evaluating microgap breakdown mode transition with electric field non-uniformity", Sep. 2018, Plasma Sources Science and Technology 27(9), 1-8 (Year: 2018).*

Fu, Y., Zhang, P., and Verboncoeur, J. Paschen's Curve in Microgaps with an Electrode Surface Protrusion. Applied Physics Letters, vol. 113, Issue 5 [online], published Aug. 3, 2018 [retrieved Oct. 2, 2019], Retrieved from the Internet:<URL:https://doi.org/10.1063/1.5045182>.

* cited by examiner

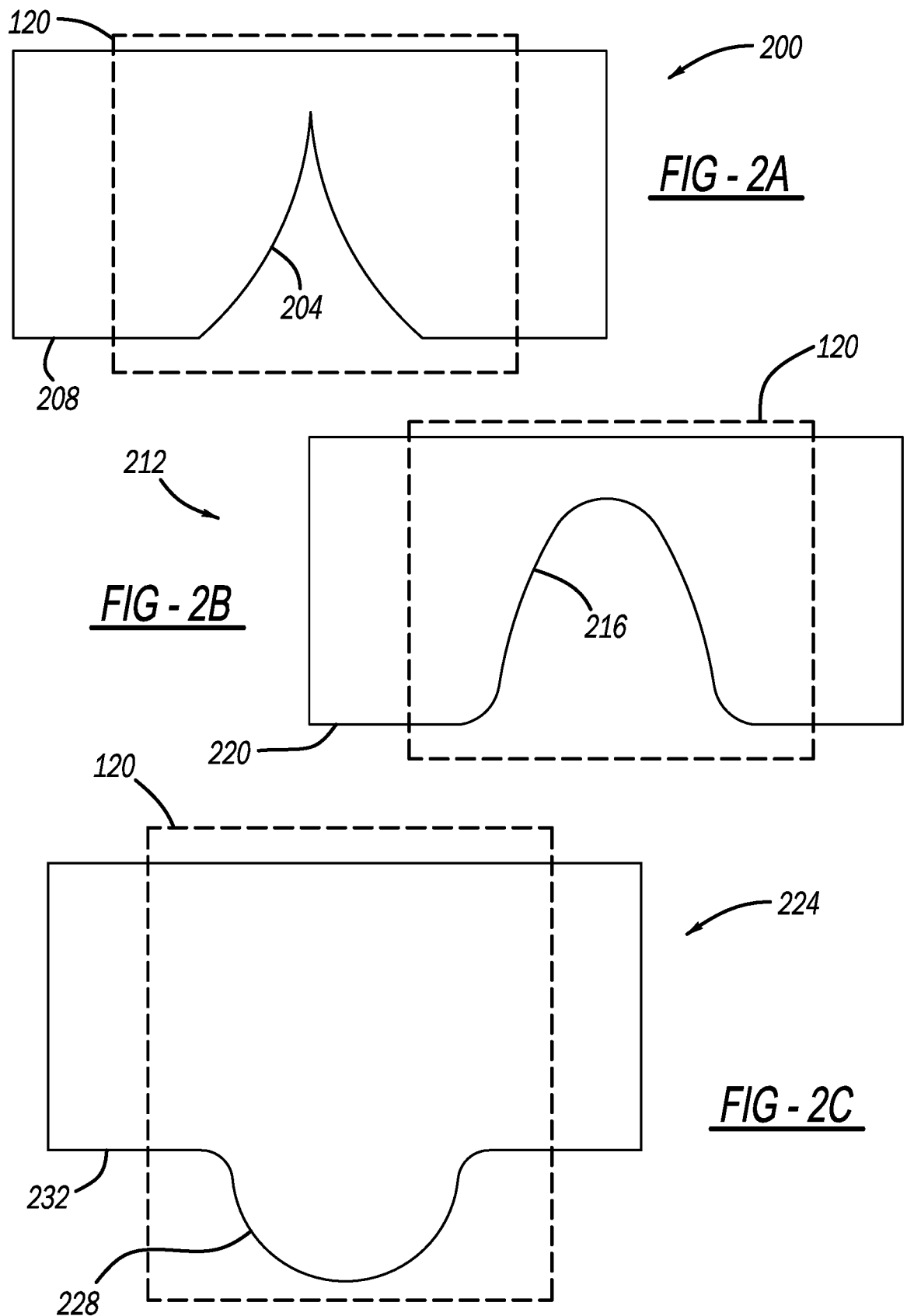

MICROSCALE GAS BREAKDOWN DEVICE AND PROCESS

CROSS-REFERENCE TO RELATED APPLICATIONS

This application claims the benefit of U.S. Provisional Application 62/711,109, filed Jul. 27, 2018. The entire disclosure of the above application is incorporated herein by reference.

STATEMENT REGARDING FEDERALLY SPONSORED RESEARCH OR DEVELOPMENT

This invention was made with government support under FA9550-18-1-0061 and under FA9550-18-1-0062 awarded by the U.S. Air Force Office of Scientific Research, and under DE-SC0001939 awarded by the U.S. Department of Energy. The government has certain rights in the invention.

FIELD

The present disclosure relates to a microscale gas breakdown device and, more particularly, to controlling breakdown voltage and current based on protrusions or perturbations of the electrodes of the microscale gas breakdown device.

BACKGROUND

Paschen's curve describes the breakdown voltage as a function of the combined parameter pd (gas pressure p×gap distance d). Under a uniform electric field, Paschen's curve is an effective way to analyze the electrical characteristics of a macroscale gas gap. In recent years, 3D printing technology enables increasingly complicated geometries in plasma devices down to the micron scale.

The background description provided here is for the purpose of generally presenting the context of the disclosure. Work of the presently named inventors, to the extent it is described in this background section, as well as aspects of the description that may not otherwise qualify as prior art at the time of filing, are neither expressly nor impliedly admitted as prior art against the present disclosure.

SUMMARY

A microscale gas breakdown device includes a first surface and a second surface. The first surface and the second surface define a gap distance. The device includes a perturbation on the first surface and/or the second surface. The perturbation is defined by a height value and a radius value. The device includes a current source or a voltage source configured to apply a current or a voltage across the first surface and the second surface. In response to the current or the voltage being applied, a resulting discharge travels along a first discharge path in response to being exposed to a high pressure and a second discharge path in response to being exposed to a low pressure.

In other features, the first discharge path is shorter than the second discharge path. In other features, the height value and the radius value of the perturbation are based on an average expected pressure surrounding the microscale gas breakdown device. In other features, the height value and the radius value of the perturbation are based on an expected range of pressure. In other features, the first surface is an anode surface and the second surface is a cathode surface. In other features, the first surface is a cathode surface and the second surface is an anode surface. In other features, the perturbation is convex such that a distance between a tip of the perturbation existing in the first surface and the second surface is a shortest gap distance.

In other features, the perturbation is concave such that a distance between a bottom of the perturbation existing in the first surface and the second surface is a longest gap distance. In other features, the radius value is less than a length of the first surface and the second surface. In other features, the height value is less than the gap distance. In other features, the first surface is flat and parallel to a non-perturbation portion of the second surface. In other features, the current source or the voltage source is electrically coupled to the first surface at a first end of the voltage source and electrically coupled to the second surface at a second end of the voltage source.

In other features, a plurality of discharge paths are available between the first surface and the second surface, and wherein the plurality of discharges paths vary in length and correspond to the gap distance along a length of the first surface and the second surface. In other features, the resulting discharge travels along a discharge path at a discharge point along a length of the first surface and the second surface based on an actual pressure experienced.

A microscale gas breakdown device includes an anode surface and a cathode surface. The anode surface and the cathode surface are separated by a gap distance. The device includes a perturbation on the cathode surface. The perturbation is defined by a height value and a radius value. The height value and the radius value of the perturbation are based on an expected range of pressure. The device includes a current source or a voltage source configured to apply a current or a voltage across the anode surface and the cathode surface. In response to the current or the voltage being applied, a resulting discharge travels along a first discharge path in response to being exposed to a high pressure and a second discharge path in response to being exposed to a low pressure. The first discharge path is shorter than the second discharge path.

In other features, the first discharge path is from a tip of the perturbation to the anode surface. In other features, the second discharge path is from a parallel surface of the cathode surface to the anode surface. In other features, the device includes a second perturbation on the cathode surface protruding in a direction opposite the perturbation.

A microscale gas breakdown device includes an anode surface and a cathode surface. The anode surface and the cathode surface are separated by a gap distance. The device includes a perturbation on the cathode surface. The perturbation is defined by a height value and a radius value. The height value and the radius value of the perturbation are based on an expected range of pressure. The device includes a current source or a voltage source configured to apply a current or a voltage across the anode surface and the cathode surface. In response to the current or the voltage being applied, a resulting discharge travels from the anode surface to a tip of the perturbation on the cathode surface in response to being exposed to a high pressure and the anode surface to a portion of the cathode surface parallel to the anode surface in response to being exposed to a low pressure. A distance from the anode surface to the tip of the perturbation on the cathode surface is shorter than a distance from the anode surface to the portion of the cathode surface parallel to the anode surface. In other features, the perturbation is a protrusion or a dent, or a combined structure.

Paschen's curve in microgaps with a hemi-ellipsoidal protrusion on the electrode surface is demonstrated using a multi-dimensional hydrodynamic plasma simulations. The breakdown voltage is identified when the discharge enters the subnormal region, according to voltage-current characteristics. The breakdown in a microgap with a surface protrusion on the electrode can result in a combined Paschen's curve, which transits from long-gap (distance between the cathode and anode without the presence of protrusion) behavior at low pressure to short-gap (distance between the protrusion apex to the opposite electrode) behavior at high pressure. As gas pressure decreases, the length of the optimal discharge path increases, automatically moving from the top of the protrusion to its side surface and then to the wider non-protrusion electrode gap. The shape of the protrusion defines the current-voltage relationship as discharge length adjusts to the pressure. Microgaps can be designed to have controlled breakdown voltage across many orders in pressure via engineered electrode morphology.

Further areas of applicability of the present disclosure will become apparent from the detailed description, the claims, and the drawings. The detailed description and specific examples are intended for purposes of illustration only and are not intended to limit the scope of the disclosure.

BRIEF DESCRIPTION OF THE DRAWINGS

The present disclosure will become more fully understood from the detailed description and the accompanying drawings.

FIG. 2A is an example schematic of a microgap electrode with a pointed convex protrusion on a cathode surface.

FIG. 2B is an example schematic of a microgap electrode with a mixed convex and concave protrusion on a cathode surface.

FIG. 2C is an example schematic of a microgap electrode with an outward concave protrusion on a cathode surface.

In the drawings, reference numbers may be reused to identify similar and/or identical elements.

DETAILED DESCRIPTION

Figure 1:
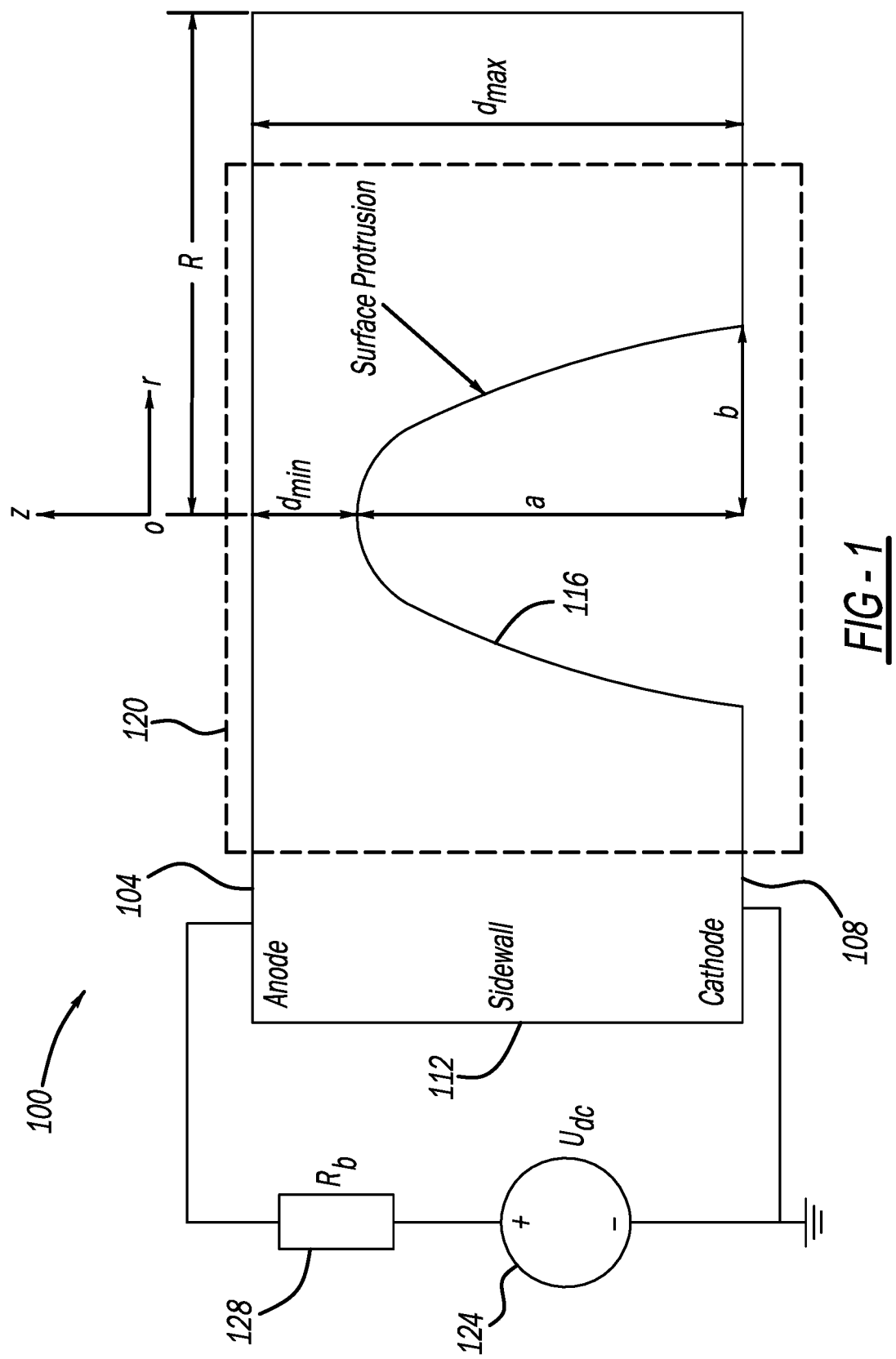
FIG. 1 is an example schematic of a microgap electrode with a convex protrusion on a cathode surface.

A microscale gas breakdown device or microgap electrode with a protrusion, perturbation, or engineered surface structure (for example, a rippled surface) is configured to transition from long-gap behavior at low pressure to short-gap behavior at high pressure, stabilizing a breakdown voltage across a range of pressures as well as gap distances. The breakdown voltage characteristics of the microgap can be adjusted using the engineered surface morphology of the electrode. For example, a current-voltage relationship across the microgap can be altered based on the engineered surface morphology of the electrode. Additionally, the engineered surface morphology of the microgap electrode could be designed to control the breakdown voltages at varying pressures. In this way, the breakdown voltage could vary across pressures in a controlled manner, ensuring the breakdown voltage value at different pressures.

In general, a gas breakdown in microplasmas and microdischarges with characteristic lengths less than 1 mm is key in many applications, including micro-electro-mechanical systems (MEMS), micro-switches, micro-sensors, and microchip devices. The engineered microgap electrode can be used to design gas breakdown devices with controlled breakdown voltages across many orders in pressure and gap size, which may be used in microscale device applications, for example, to improve space communications. Moreover, engineered microgap electrodes could further assist in automotive applications where gas compositions could affect the performance of a component, for example, a spark plug. The engineered microgap electrode may also be used in nanovacuum electron devices (NVEDs). NVEDs have radiation advantages as well as very high mobility compared to semiconductors, and much higher heat tolerance, meaning engineered microgap electrodes can assist and improve current NVED technologies by ensuring a stabilized or controlled breakdown voltage.

Recent advances in diagnostics and modeling of complex plasma systems opened an opportunity to identify new characteristics of the gas breakdown in microgaps under direct current (DC) fields and other discharges. A DC microgap breakdown at atmospheric pressure is ignited and maintained by secondary electron emission when the gap distance is greater than ~10 μm, whereas field emission becomes dominant when the gap distance is less than a few microns, especially with micro-protrusions on the cathode surface. Furthermore, the Townsend scaling law still holds for discharges in microgaps unless the field emission becomes dominant.

Additionally, characterizing a parallel-plane microdischarge at high pressure is not easy since discharge instabilities often occur, especially with the presence of the protrusion on the electrode surface, making a parallel-plane microdischarge less ideal. The surface protrusion usually leads to the enhancement of the local electric field. The field enhancement may not necessarily bring the discharge into the field emission regime unless the electric field reaches the order of $10^9$ V/m. For normal atmospheric discharges with hundreds of microns gap length, the electric field is usually in the order of $10^7$ V/m and the discharge is still mainly sustained by the ion-impact secondary electron emission on the cathode.

However, even without the field emission, the protrusion will change the gap geometry and thus impact the electric field distributions and the charge fluxes, which may significantly change the shape of breakdown curves. Using a two-dimensional fluid model, the Townsend breakdown voltages in microgaps may be quantified based on the voltage-current characteristics when the discharge enters the subnormal region with a negative differential resistance.

Figure 6:
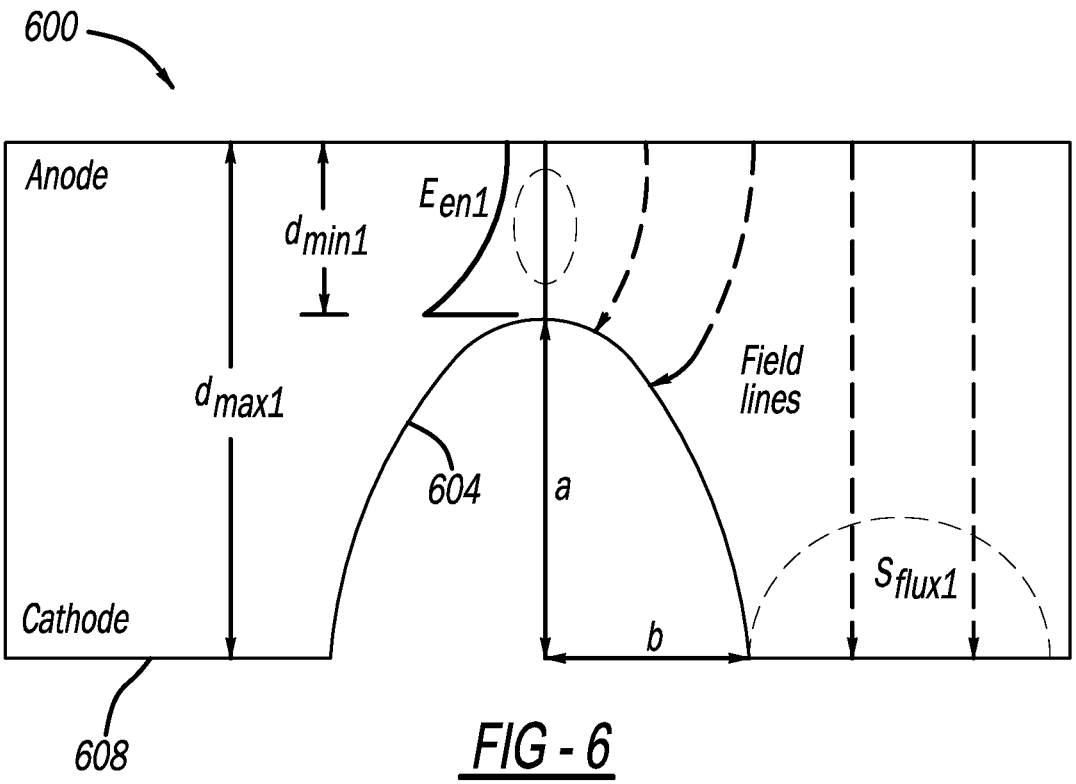
FIG. 6 is a schematic depiction of a discharge process of a microgap electrode with a protrusion on a cathode surface of the microgap electrode.

The surface protrusion on the cathode electrode, shown in FIG. 1 and FIG. 6, results in a combined Paschen's curve, which transits from the long-gap behavior at low pressure to the short-gap behavior at high pressure, resulting in relatively low breakdown voltages in a wider pressure range. As the gas pressure transits from the low to the high-pressure regime, the discharge automatically optimizes its discharge path to obtain the lowest breakdown voltage. At high pressure, the discharge occurring between the protrusion tip (or a bottom of the dent caused by the protrusion) and the opposite electrode, in this case, the anode, is mainly determined by the shortest gap distance as well as the electric field enhancement. At low pressure, the discharge occurring between the protrusion substrate and the opposite electrode is mainly characterized by the longest gap distance with larger effective cathode emission area. To design microgap electrodes with controlled breakdown voltage across many orders in pressure using the shaping of protrusions, the presently disclosed invention identifies key parameters for gas breakdown in microgaps with a surface protrusion over a wide range of pressures.

Referring now to FIG. 1, an example schematic of a microgap 100 is shown. The microgap 100 includes an anode surface 104, a cathode surface 108, and a sidewall 112. On the cathode surface 108, the microgap 100 includes a convex protrusion 116 on the cathode surface 108. As shown in FIG. 1, the convex protrusion 116 is operating as a part of the cathode 108. The convex protrusion 116 (for example, a hemi-ellipsoid) has a height a and a radius b. The convex protrusion 116 geometry is shown in area 120 of the microgap 100.

A DC voltage source 124 applies a DC voltage ($U_{dc}$) to the anode 104 through a ballast resistor 128 $R_b$=100 kΩ, while the cathode 108 is grounded. The microgap electrode 100 consists of two plane-parallel circular electrodes 104, 108 with a single hemi-ellipsoidal protrusion or the convex protrusion 116 on the cathode 108. The convex protrusion 116 results in the minimum distance, $d_{min}$, from the tip to the anode 104. The maximum gap distance, $d_{max}$, is between the flat surface of the cathode 108 and the anode 104. The coordinates are in the r–z plane, and R is the electrode radius. In various implementations, $d_{max}$=500 μm and R=1000 μm, and the impact of the aspect ratio of the microgap 100 (related to the transverse diffusion) can be excluded since the sidewall 112 is relatively far from the axis. The geometry of the convex protrusion 116 is characterized by the protrusion height a and the radius b. In various implementations, argon gas at room temperature 300K (0.026 eV) is the working gas.

The discharge is sustained by ion impact secondary electron emission at the cathode 108, where field emission can be ignored since the shortest distance $d_{min}$ is no less than 50 μm and the maximum effective electric field including the modest field enhancement of the convex protrusion 116 tip is much smaller than $10^9$ V/m. The normal flux of electrons emitted by the cathode 108 is related to the flux of incident ions by an effective secondary emission coefficient γ, which can vary from 0.01-0.09 depending on materials and ions.

FIGS. 2A-2D depict different protrusion geometries of example microgap electrode implementations. While five total geometries are shown, additional geometries of varying height and radius can also be used for a microgap electrode to achieve a desired stabilized breakdown voltage (or current) or a controlled breakdown voltage (or current). The surface morphology determines the relationship between voltage and current.

Figure 2D:
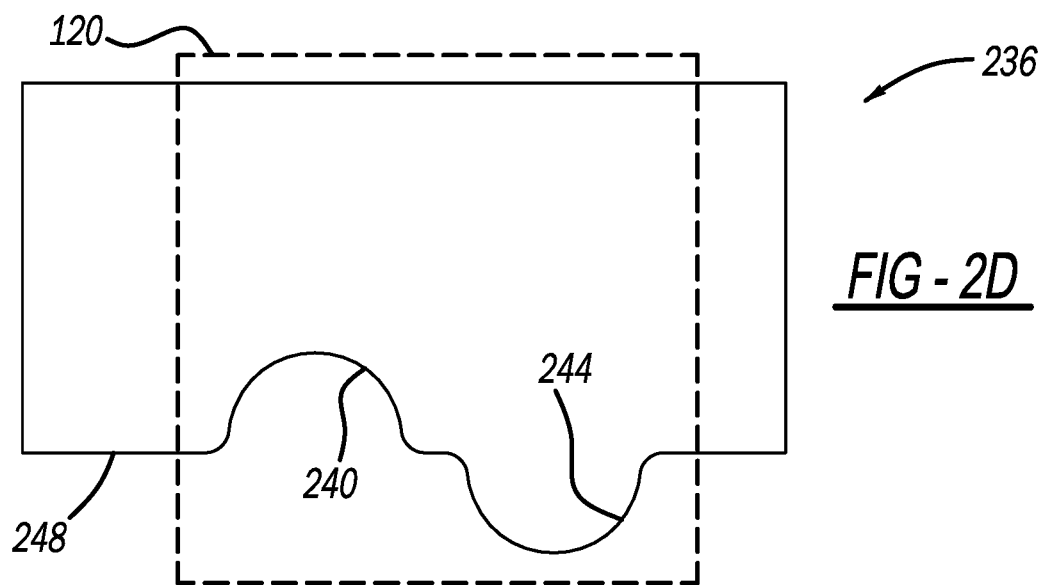
FIG. 2D is an example schematic of a microgap electrode with a convex and a concave protrusion on a cathode surface.

FIG. 2A is an example schematic of a microgap 200 with a pointed convex protrusion 204 on a cathode surface 208 is shown. FIG. 2B is a microgap 212 with a mixed convex and concave protrusion 216 on a cathode surface 220. FIG. 2C depicts a microgap 224 with an outward concave protrusion 228 on a cathode surface 232. Additionally, FIG. 2D is an example schematic of a microgap 236 with a convex 240 and a concave protrusion 244 on a cathode surface 248. While each of the geometries is shown on the cathode surface, similar geometries may be implemented on an anode surface of the microgap. However, an engineered anode behaves differently than the cathode analog in DC due to the different flow of electrons versus ions resulting from the different masses, charges, and field lines.

Figure 3:
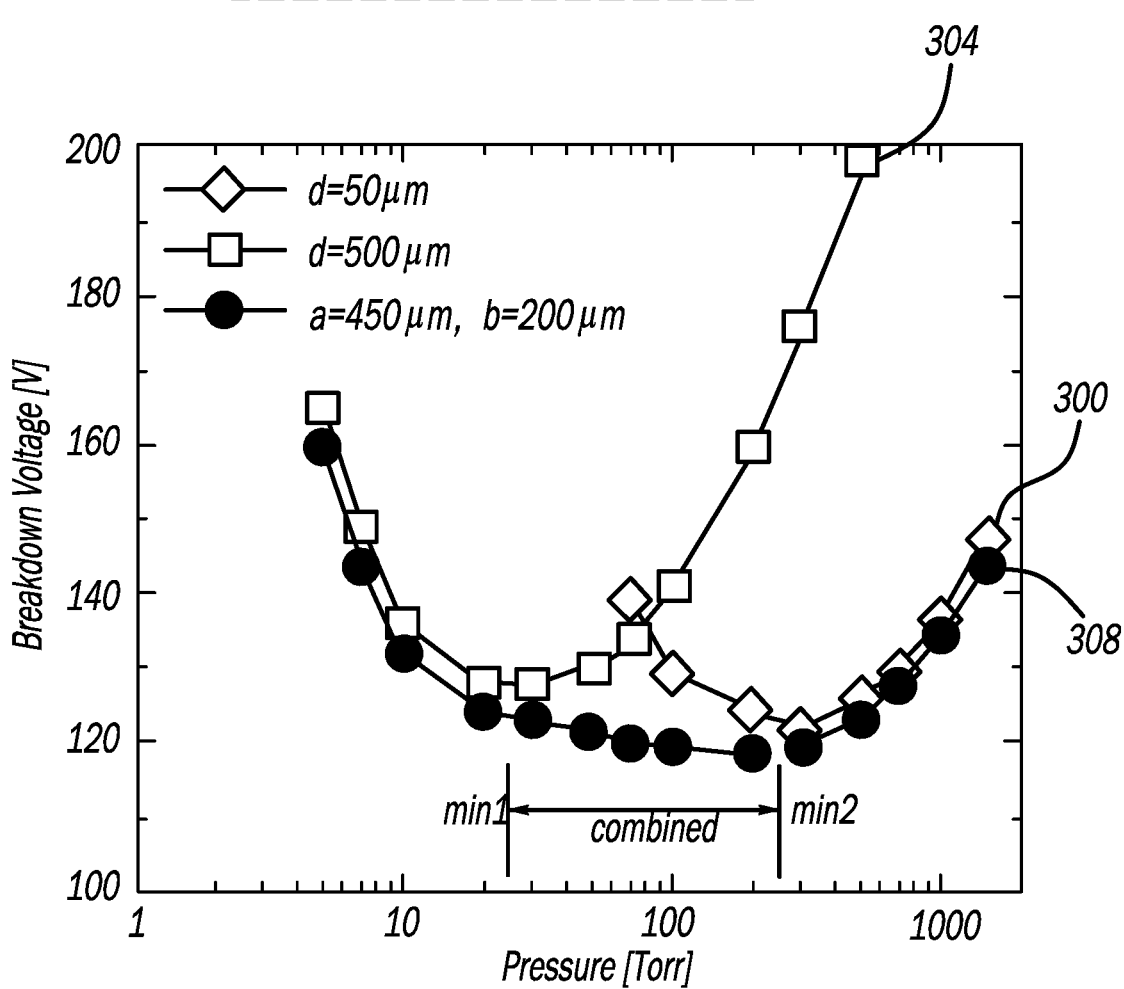
FIG. 3 is a graphical depiction of a breakdown voltage as a function of gas pressure for (i) a short-gap parallel plate, (ii) a long-gap parallel plate, and (iii) the microgap electrode of FIG. 1.

Referring now to FIG. 3, a graphical depiction of breakdown voltage as a function of gas pressure for (i) a short-gap parallel plate, (ii) a long-gap parallel plate, and (iii) the microgap 100 of FIG. 1. A first line 300 shows the breakdown voltage as a function of gas pressure for the short-gap parallel plate (d=50 μm). A second line 304 shows the breakdown voltage as a function of gas pressure for the long-gap parallel plate (d=500 μm).

A third line 308 shows the calculated breakdown voltage as a function of gas pressure for the microgap 100 of FIG. 1 with a hemi-ellipsoidal protrusion (a=450 μm and b=200 μm) on the cathode surface, resulting in $d_{min}$=50 μm and $d_{max}$=500 μm on the microgap 100. As depicted by the third line 308, the Paschen's curve shifts from the low-pressure regime for the long gap (d=500 μm) to the high-pressure regime for the short gap (d=50 μm). The lowest point of the Paschen's curve for parallel plate gaps (without protrusion) of d=50 μm and d=500 μm, as shown by the first line 300 and the second line 304, is about 1.0-1.5 Torr·cm, which is close to the Paschen's minimum (Stoletov point) for argon. The cathode surface protrusion results in a combined Paschen's curve, which transits from long-gap behavior at low pressure to short-gap behavior at high pressure, resulting in relatively low breakdown voltages in a wider range of pressures. This is due to the migration of the major discharge path as the pressure changes.

That is, the discharge path changes with changes in pressure. For example, at high pressure of 500 Torr, the discharge mainly occurs between the protrusion tip and the opposite anode, which is the shortest discharge path ($d_{min}$). When the pressure decreases to 100 Torr and 50 Torr, the discharge follows a longer path and the cathode emission migrates along the protrusion surface. When the pressure is much lower at 10 Torr, the discharge mainly occurs between the anode and the cathode substrate ($d_{max}$) In various implementations, at high pressure, the discharge path may vary and occur across a distance longer than the minimum distance. Similarly, at low pressure, the discharge path may vary and occur across a distance shorter than the maximum distance. Additionally, at intermediate pressures, the surface morphology determines the discharge path and properties.

The self-adjusted discharge paths at different pressures occur due to the mean free path of electron-neutral collision. According to Paschen's law, the Stoletov point with the lowest breakdown voltage is:

$$(pd)_{Stoletov} = \frac{\exp(1) \cdot \ln(1/\gamma)}{A} \quad (1)$$

where $\gamma$ is the effective secondary electron emission coefficient, the constant $A=\sigma_{en}/(k_B T_g)$, $\sigma_{en}$ is the electron-neutral collision cross section, $k_B$ is Boltzmann's constant, and $T_g$ is the temperature of the neutral gas. Substituting the ideal gas equation of state $p=n_g k_B T_g$ and the mean free path of electron-neutral collision $\lambda=1/(\sigma_{en} n_g)$, with $n_g$ being the neutral gas density, into Equation (1), a linear relationship between the most effective discharge path and the electron mean free path is obtained:

$$d_{Stoletov} = C\lambda \quad (2)$$

where the ratio C is expressed as $C=\exp(1)\cdot\ln(1/\gamma)$. According to Equation (2), to obtain the lowest breakdown voltage $U_{min}$, the discharge automatically optimizes its path and the discharge path length is determined by the electron mean free path. As described above, as the pressure decreases, the electron mean free path increases as well as the effective discharge path length.

For the combined Paschen's curve in the third line 308 of FIG. 3, in the right branch (at high pressure), the discharge tends to occur across the shortest gap distance $d_{min}$, and the breakdown curve is close to the first line 300 depicting the 50 µm parallel-plate gap. In the left branch (at low pressure), the discharge tends to occur across the longest gap distance, $d_{max}$, and the breakdown behavior is similar to the second line 304 showing the 500 µm parallel-plate gap. Between the two minimums, the discharge automatically optimizes its discharge path, which results in a flattened Paschen's curve with relatively low breakdown voltages close to $U_{min}$ over a wide pressure range.

In various implementations, the cathode is disposed opposite from the anode. However, the cathode does not need to be disposed opposite from the anode. Instead, the microgap could include coplanar devices in the same sense as a coplanar plasma display panel, where the field lines curve in an arc between the surfaces.

Figure 4A:
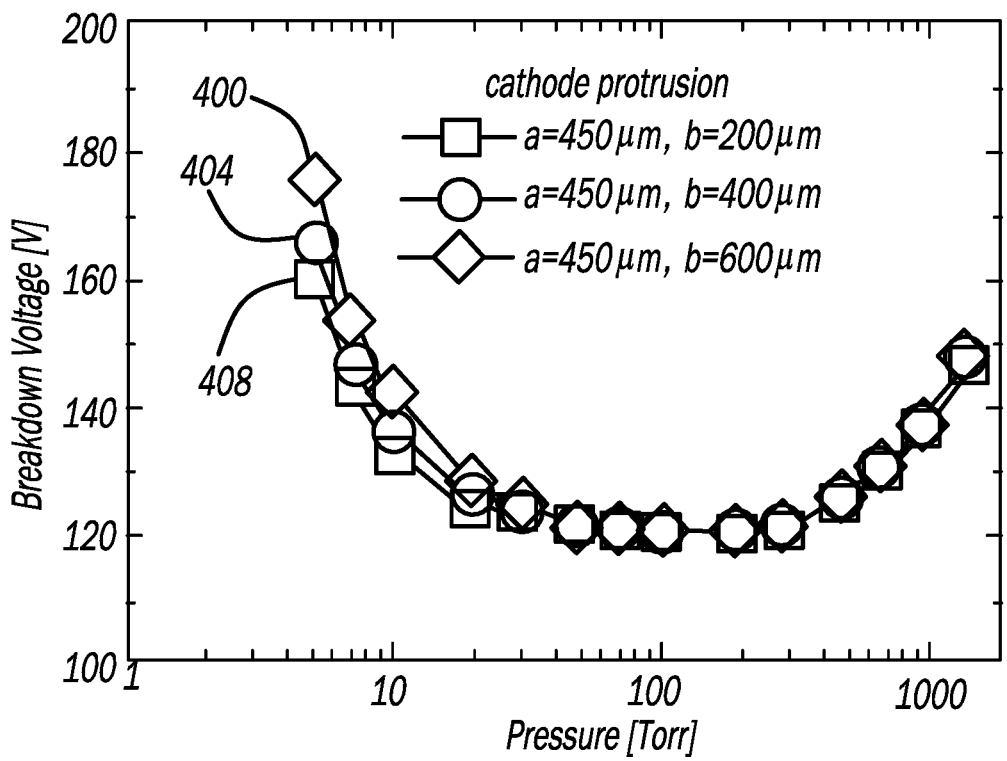
FIG. 4A is a graphical depiction of a breakdown voltage as a function of gas pressure for microgap electrodes with protrusions of different radii.

FIG. 4A is a graphical depiction of a breakdown voltage as a function of gas pressure for microgap electrodes with protrusions of different radii. A large radius line 400 shows the breakdown voltage of a microgap electrode with a protrusion with a height of 450 µm and a radius of 600 µm. A medium radius line 404 shows the breakdown voltage of a microgap electrode with a protrusion with a height of 450 µm and a radius of 400 µm. A small radius line 408 shows the breakdown voltage of a microgap electrode with a protrusion with a height of 450 µm and a radius of 200 µm. The difference of Paschen's curves caused by changing the protrusion radius is recognized in the left branch but less obvious in the right branch. In the high-pressure regime, since the protrusion height a and the $d_{min}$ are fixed, the discharge occurs along the shortest path, not affected by the increase in the protrusion radius. Thus, the Paschen's curves overlap in the right branch. In the low-pressure regime, the discharge has a longer path and the ion-impact secondary emission mainly occurs in the cathode substrate. When the protrusion radius is larger, the effective cathode substrate area for the ion-impact flux becomes smaller, which needs a higher voltage to ignite the discharge. Thus, in the left branch, the smaller the protrusion radius, the lower the breakdown curve.

Figure 4B:
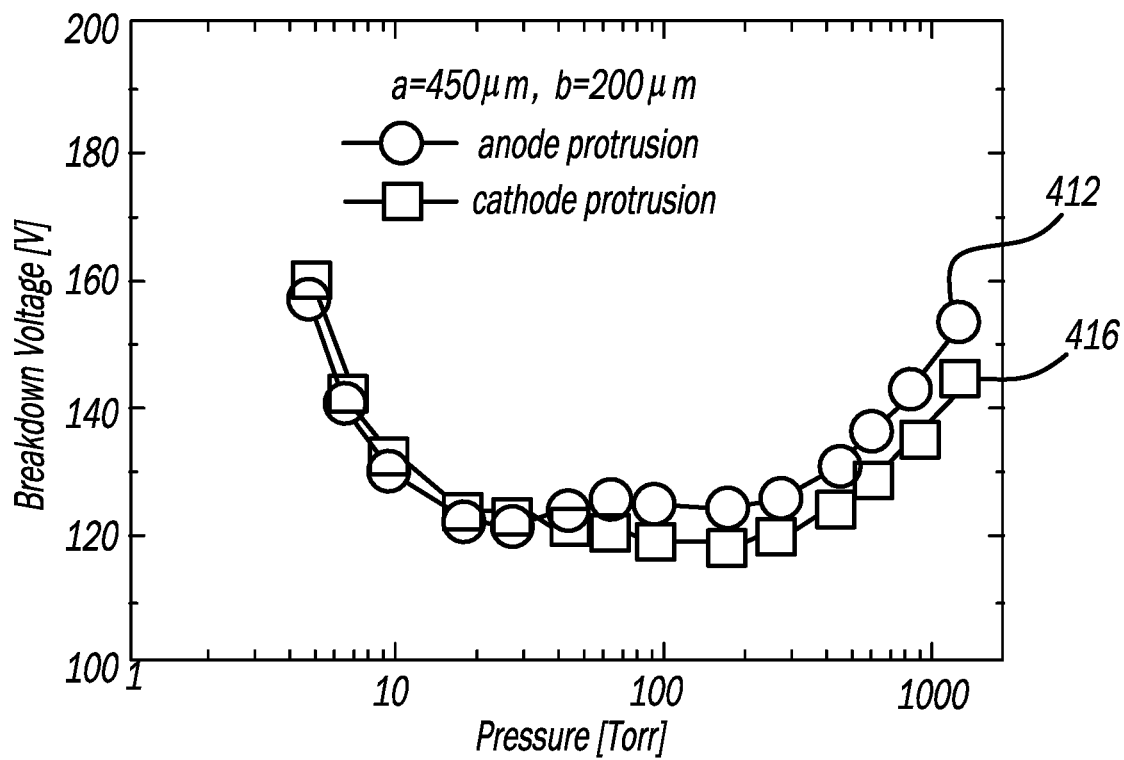
FIGS. 4B-4D are graphical depictions of breakdown voltages as functions of gas pressure for microgap electrodes with protrusions on an anode surface and a cathode surface of the microgap electrodes where the protrusions are varying in radii.
Figure 4C:
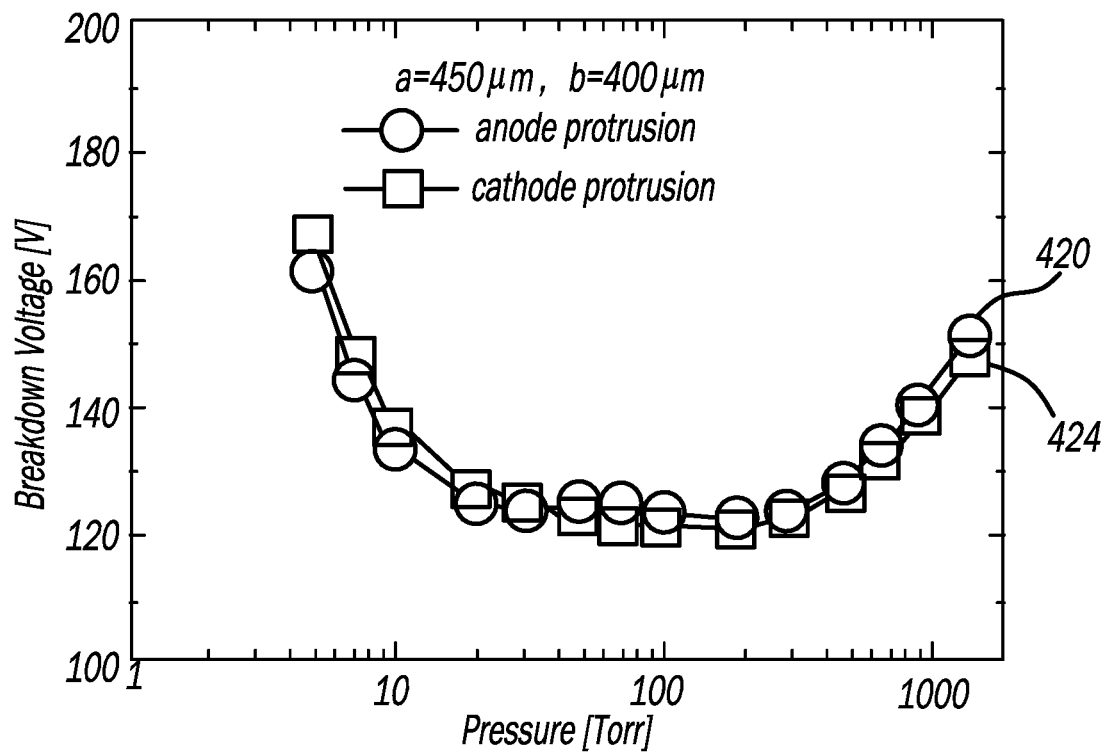
Figure 4D:
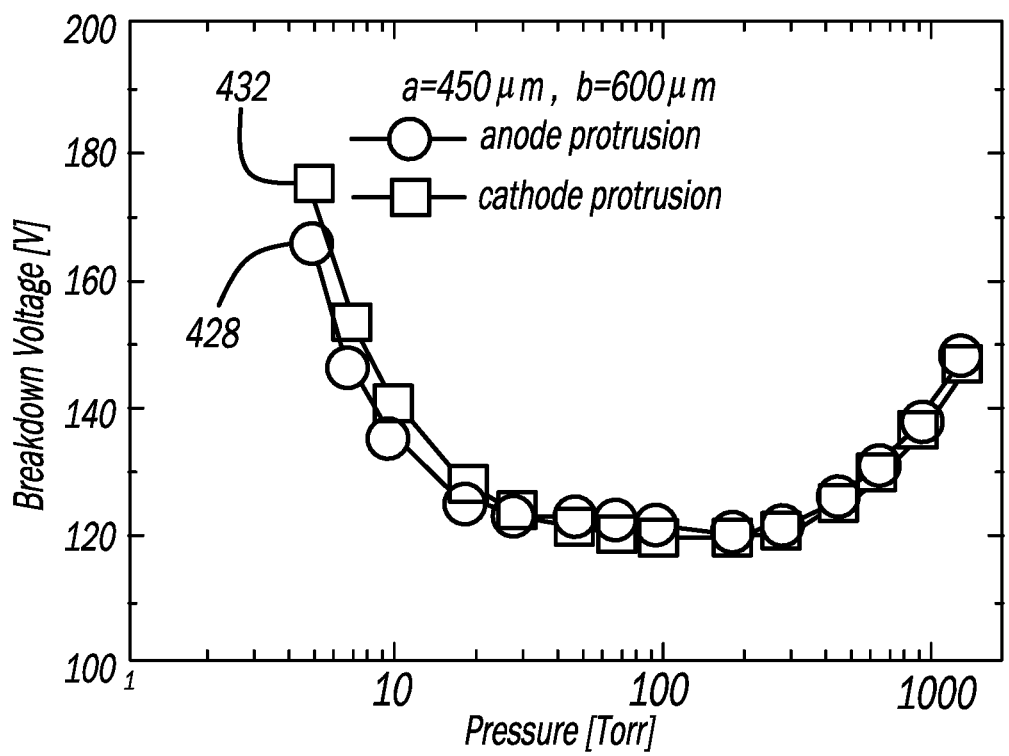

FIGS. 4B-4D are graphical depictions of breakdown voltages as functions of gas pressure for microgap electrodes with protrusions on an anode surface and a cathode surface of the microgap electrodes where the protrusions are varying in radii. In FIG. 4B, a small anode protrusion line 412 shows the breakdown voltage of a microgap electrode with a protrusion with a height of 450 µm and a radius of 200 µm. A small cathode protrusion line 416 shows the breakdown voltage of a microgap electrode with a protrusion with a height of 450 µm and a radius of 200 µm.

In FIG. 4C, a medium anode protrusion line 420 shows the breakdown voltage of a microgap electrode with a protrusion with a height of 450 µm and a radius of 400 µm. A medium cathode protrusion line 424 shows the breakdown voltage of a microgap electrode with a protrusion with a height of 450 µm and a radius of 400 µm.

In FIG. 4D, a large anode protrusion line 428 shows the breakdown voltage of a microgap electrode with a protrusion with a height of 450 µm and a radius of 600 µm. A large cathode protrusion line 432 shows the breakdown voltage of a microgap electrode with a protrusion with a height of 450 µm and a radius of 600 µm. The effect of discharge polarity on the Paschen's curves shown in FIGS. 4B-4D seems minor. However, it still shows a tendency that with an anode protrusion, it has a slightly lower breakdown voltage in the left branch of Paschen's curve but a slightly higher breakdown voltage in the right branch.

Similarly, the difference can be explained by the effective ion-impact flux on the cathode surface. At low pressures, the cathode effective emission area with an anode protrusion is larger than that with a cathode protrusion. Also, with an anode protrusion, the diverging (with respect to the center of the cathode) field lines (shown in FIGS. 6 and 7) result in a higher ion flux toward the effective emission area of the flat cathode, whereas with a cathode protrusion, the diverging field lines towards the center lead to a lower ion flux toward the effective emission area of the flat cathode substrate. The combination of these two factors results in a lower breakdown voltage in the left branch for the anode protrusion cases. As shown in FIGS. 4B-4D, the smaller the area of the flat cathode substrate, the larger the difference in the left branch caused by the discharge polarity.

As discussed above, at high pressures, the discharge occurs between the protrusion tip and the opposite electrode. When the discharge occurs between the protrusion tip and the opposite electrode, the field enhancement should be considered. With a cathode protrusion, the electric field is enhanced near the cathode tip, and consequently, the cathode ion-impact flux becomes more efficient. Instead, with an anode protrusion, the electric field is more enhanced near the anode with less space charge effect in the Townsend regime resulting in the cathode ion-impact flux being less efficient.

Additionally, at high pressures, the discharge is contracted in the center, and the electric field lines (shown in FIGS. 6 and 7) towards the cathode center are converging with a cathode protrusion while diverging with an anode protrusion. Therefore, the breakdown voltage with a cathode protrusion is lower than that with an anode protrusion in the right branch. Since the field enhancements generally are not severe (within one order) here, the difference between the Paschen's curves caused by the discharge polarity is not large. The field enhancement decreases as the protrusion radius becomes larger and the polarity effect in the right branch gradually disappears.

Figure 5A:
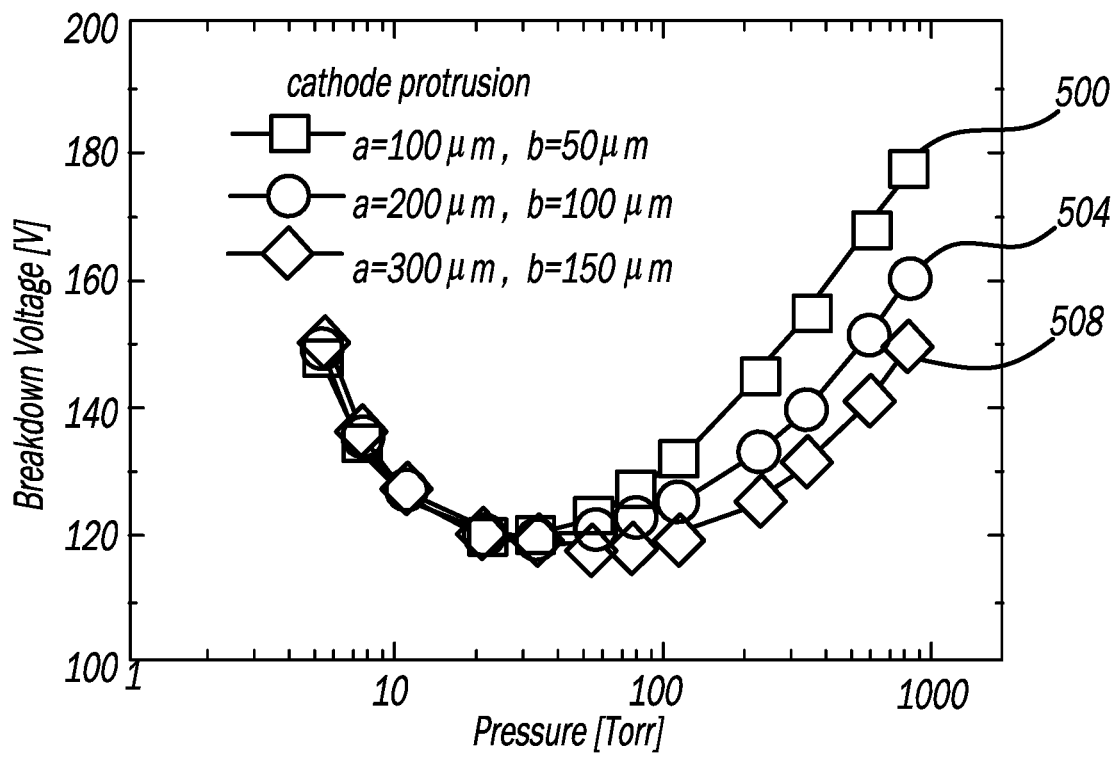
FIG. 5A is a graphical depiction of a breakdown voltage as a function of gas pressure for microgap electrodes with protrusions of varying sizes while maintaining an aspect ratio.

FIG. 5A is a graphical depiction of a breakdown voltage as a function of gas pressure for microgap electrodes with protrusions of varying sizes while maintaining an aspect ratio. A smaller protrusion line 500 depicts the breakdown voltage of a microgap electrode with a cathode protrusion with a height of 100 μm and a radius of 50 μm. A medium protrusion line 504 depicts the breakdown voltage of a microgap electrode with a cathode protrusion with a height of 200 μm and a radius of 100 μm. A large protrusion line 508 depicts the breakdown voltage of a microgap electrode with a cathode protrusion with a height of 300 μm and a radius of 150 μm. The three lines shown in FIG. 5A have varying protrusion heights and radii but maintain the same aspect ratio. As shown, the impact of the protrusion height on the Paschen's curve is more distinguishable in the right branch and almost negligible in the left branch. The difference can be explained in a similar way as before. The discharge at low pressure is determined by the longest gap distance $d_{max}$. The discharge at high pressure is determined by the shortest gap distance $d_{min}$, which decreases as the protrusion height a increases. At a specific pressure in the right branch, the higher the protrusion, the smaller the $d_{min}$ and then the lower the breakdown voltage.

Figure 5B:
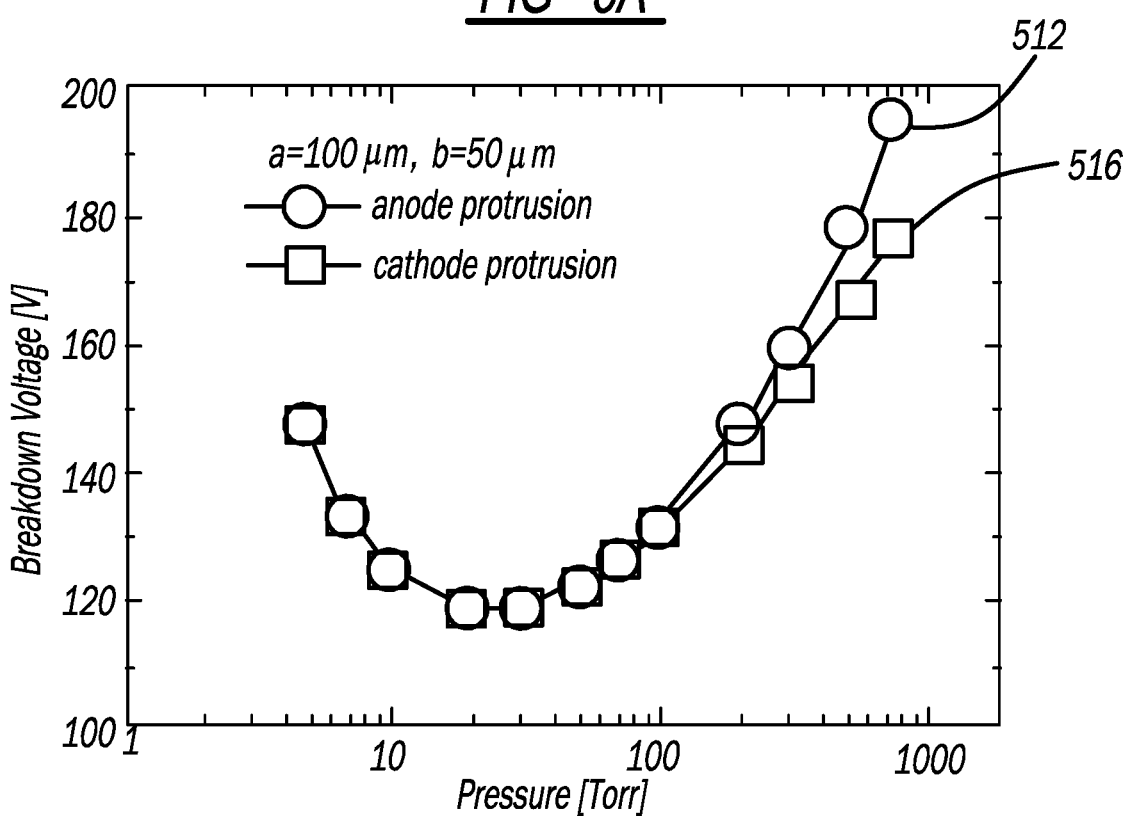
FIGS. 5B-5D are graphical depictions of breakdown voltages as functions of gas pressure for microgap electrodes with protrusions of varying sizes while maintaining an aspect ratio on an anode surface and a cathode surface of the microgap electrode.
Figure 5C:
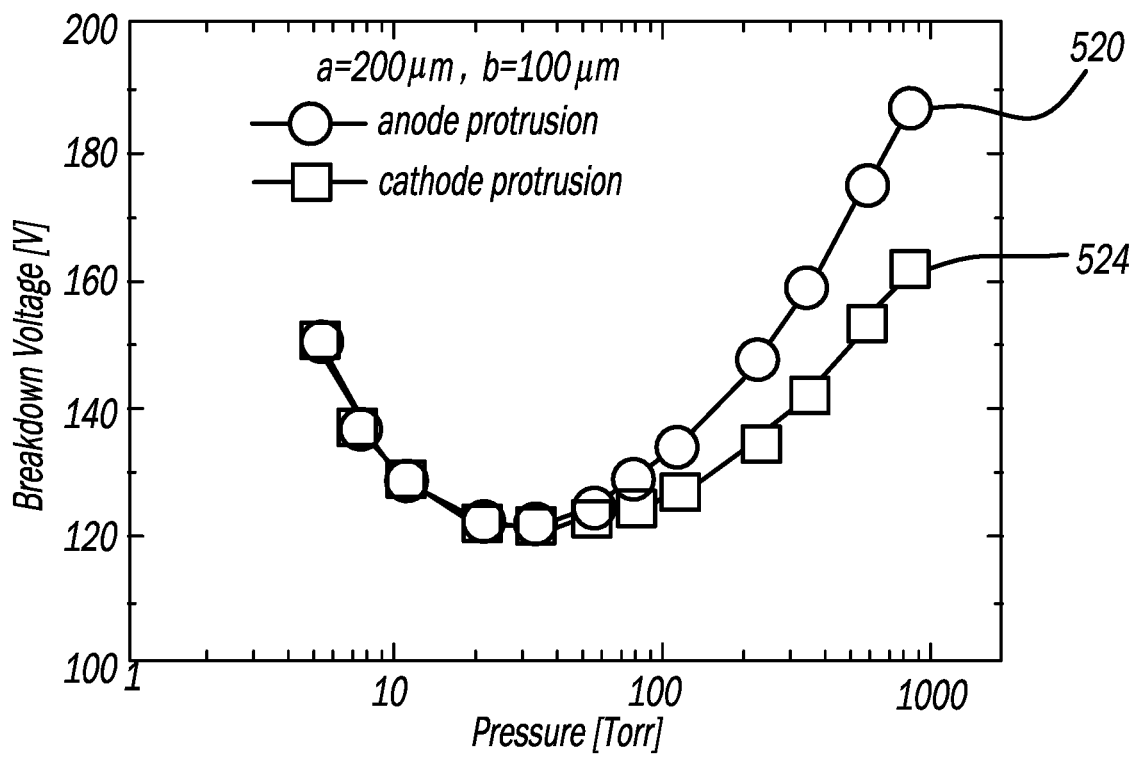
Figure 5D:
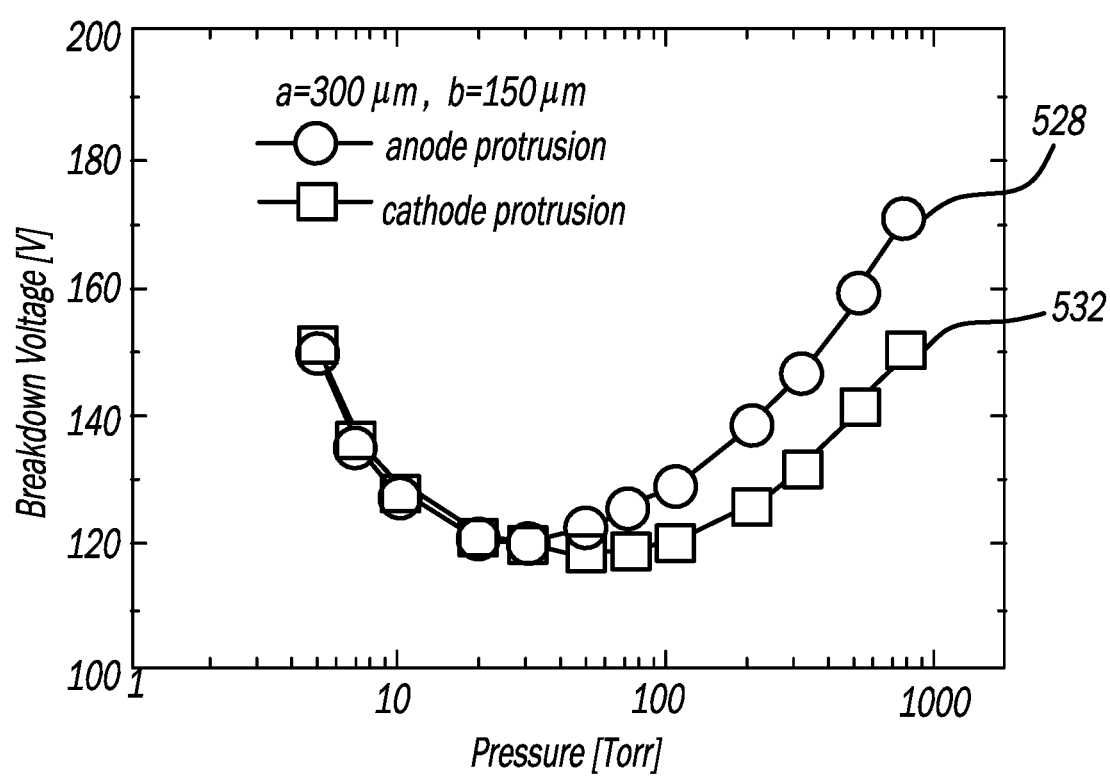

FIGS. 5B-5D are graphical depictions of breakdown voltages as functions of gas pressure for microgap electrodes with protrusions of varying sizes while maintaining an aspect ratio on an anode surface and a cathode surface of the microgap. In FIG. 5B, a small anode protrusion line 512 shows the breakdown voltage of a microgap electrode with a protrusion with a height of 100 μm and a radius of 50 μm. A small cathode protrusion line 516 shows the breakdown voltage of a microgap electrode with a protrusion with a height of 100 μm and a radius of 50 μm.

In FIG. 5C, a medium anode protrusion line 520 shows the breakdown voltage of a microgap electrode with a protrusion with a height of 200 μm and a radius of 100 μm. A medium cathode protrusion line 524 shows the breakdown voltage of a microgap electrode with a protrusion with a height of 200 μm and a radius of 100 μm.

In FIG. 5D, a large anode protrusion line 528 shows the breakdown voltage of a microgap electrode with a protrusion with a height of 300 μm and a radius of 150 μm. A large cathode protrusion line 532 shows the breakdown voltage of a microgap electrode with a protrusion with a height of 300 μm and a radius of 150 μm. The effect of the discharge polarity is clearly observed in the right branch of the Paschen's curve. As is mentioned previously, the difference is due to different electric field enhancements caused by the protrusion on the anode or the cathode. A larger field enhancement near the cathode protrusion tip results in lower breakdown voltages than that with an anode protrusion.

Figure 7:
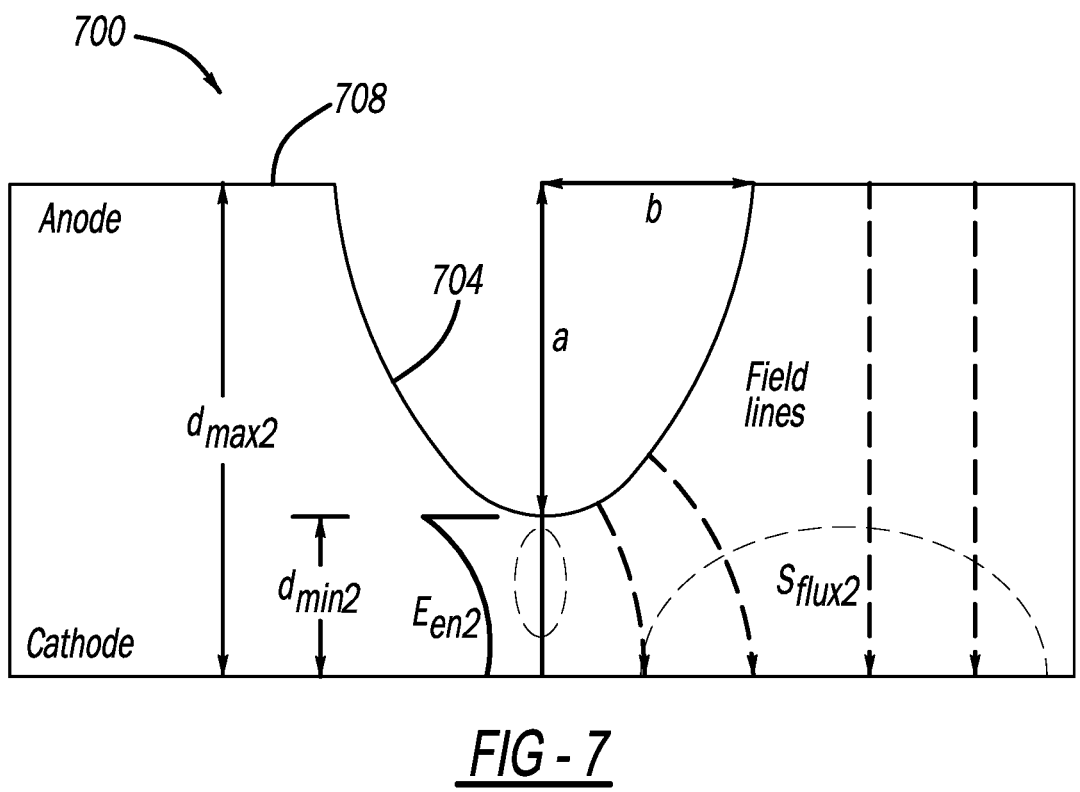
FIG. 7 is a schematic depiction of a discharge process of a microgap electrode with a protrusion on an anode surface of the micro device.

FIG. 6 is a schematic depiction of a discharge process of a microgap 600 with a protrusion 604 on a cathode surface 608 of the microgap 600. In FIG. 7, a schematic depiction of a discharge process of a microgap 700 with a protrusion 704 on an anode surface 708 of the micro device is depicted. FIGS. 6 and 7 illustrate the impacts of the anode and the cathode protrusions on discharge processes. For the given microgaps with different polarities, the key parameters are the shortest gap distances ($d_{min1}$ and $d_{min2}$), the longest gap distances ($d_{max1}$ and $d_{max2}$), the electric field enhancement between the protrusion tip and the opposite electrode ($E_{en1}$ and $E_{en2}$), and the effective cathode emission areas ($S_{flux1}$ and $S_{flux2}$). The longest gap distance, $d_{max}$, is directly determined by the parallel-plate microgap, while $d_{min}$, $S_{flux}$, and $E_{en}$ are closely related to the protrusion height a, radius b, and aspect ratio a/b, respectively. Whether $d_{max}$ and $d_{min}$ come into play depends on the gas pressure or, more exactly, the electron mean free path. For the discharge polarity effect, the difference of the field enhancement $E_{en}$ at high pressure and the effective cathode emission area $S_{flux}$ at low pressure should be considered to determine where the discharge occurs. Generally, by changing only the polarity for a given gap, i.e., when $d_{min1}=d_{min2}$ and $d_{max1}=d_{max2}$, the larger $E_{en}$ and $S_{flux}$ can both result in lower breakdown voltages.

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

What is claimed is:

1. A microscale gas breakdown device comprising:
   a first surface;
   a second surface, wherein the first surface and the second surface define a gap distance;
   a perturbation on the first surface or the second surface, wherein the perturbation is defined by a height value and a radius value; and
   a current source or a voltage source configured to apply a current or a voltage across the first surface and the second surface, and, in response to the current or the voltage being applied, a resulting discharge travels along:
      a first discharge path in response to being exposed to a high pressure; and
      a second discharge path in response to being exposed to a low pressure.

2. The microscale gas breakdown device of claim 1 wherein the first discharge path is shorter than the second discharge path.

3. The microscale gas breakdown device of claim 1 wherein the height value and the radius value of the perturbation are based on an average expected pressure surrounding the microscale gas breakdown device.

4. The microscale gas breakdown device of claim 1 wherein the height value and the radius value of the perturbation are based on an expected range of pressure.

5. The microscale gas breakdown device of claim 1 wherein the first surface is an anode surface and the second surface is a cathode surface.

6. The microscale gas breakdown device of claim 1 wherein the first surface is a cathode surface and the second surface is an anode surface.

7. The microscale gas breakdown device of claim 1 wherein the perturbation is convex such that a distance between a tip of the perturbation existing in the first surface and the second surface is a shortest gap distance.

8. The microscale gas breakdown device of claim 1 wherein the perturbation is concave such that a distance between a bottom of the perturbation existing in the first surface and the second surface is a longest gap distance.

9. The microscale gas breakdown device of claim 1 wherein the radius value is less than a length of the first surface and the second surface.

10. The microscale gas breakdown device of claim 1 wherein the height value is less than the gap distance.

11. The microscale gas breakdown device of claim 1 wherein the first surface is flat and parallel to a non-perturbation portion of the second surface.

12. The microscale gas breakdown device of claim 1 wherein the current source or the voltage source is electrically coupled to the first surface at a first end of the voltage source and electrically coupled to the second surface at a second end of the voltage source.

13. The microscale gas breakdown device of claim 1 wherein a plurality of discharge paths are available between the first surface and the second surface, and wherein the plurality of discharges paths vary in length and correspond to the gap distance along a length of the first surface and the second surface.

14. The microscale gas breakdown device of claim 1 wherein the resulting discharge travels along a discharge path at a discharge point along a length of the first surface and the second surface based on an actual pressure experienced.

15. A microscale gas breakdown device comprising:
an anode surface;
a cathode surface, wherein the anode surface and the cathode surface are separated by a gap distance;
a perturbation on the cathode surface, wherein the perturbation is defined by a height value and a radius value, and wherein the height value and the radius value of the perturbation are based on an expected range of pressure; and
a current source or a voltage source configured to apply a current or a voltage across the anode surface and the cathode surface, and, in response to the current or the voltage being applied, a resulting discharge travels along:
a first discharge path in response to being exposed to a high pressure; and
a second discharge path in response to being exposed to a low pressure, wherein the first discharge path is shorter than the second discharge path.

16. The microscale gas breakdown device of claim 15 wherein the first discharge path is from a tip of the perturbation to the anode surface.

17. The microscale gas breakdown device of claim 15 wherein the second discharge path is from a parallel surface of the cathode surface to the anode surface.

18. The microscale gas breakdown device of claim 15 further comprising a second perturbation on the cathode surface protruding in a direction opposite the perturbation.

19. A microscale gas breakdown device comprising:
an anode surface;
a cathode surface, wherein the anode surface and the cathode surface are separated by a gap distance;
a perturbation on the cathode surface, wherein the perturbation is defined by a height value and a radius value, and wherein the height value and the radius value of the perturbation are based on an expected range of pressure; and
a current source or a voltage source configured to apply a current or a voltage across the anode surface and the cathode surface, and, in response to the current or the voltage being applied, a resulting discharge travels from:
the anode surface to a tip of the perturbation on the cathode surface in response to being exposed to a high pressure; and
the anode surface to a portion of the cathode surface parallel to the anode surface in response to being exposed to a low pressure, wherein a distance from the anode surface to the tip of the perturbation on the cathode surface is shorter than a distance from the anode surface to the portion of the cathode surface parallel to the anode surface.

20. The microscale gas breakdown device of claim 19 wherein the perturbation is a protrusion or a dent, or a combined structure.

* * * * *